June 30, 1942. J. BRENZINGER 2,288,224
LINING MACHINE
Filed Nov. 14, 1940 10 Sheets-Sheet 1
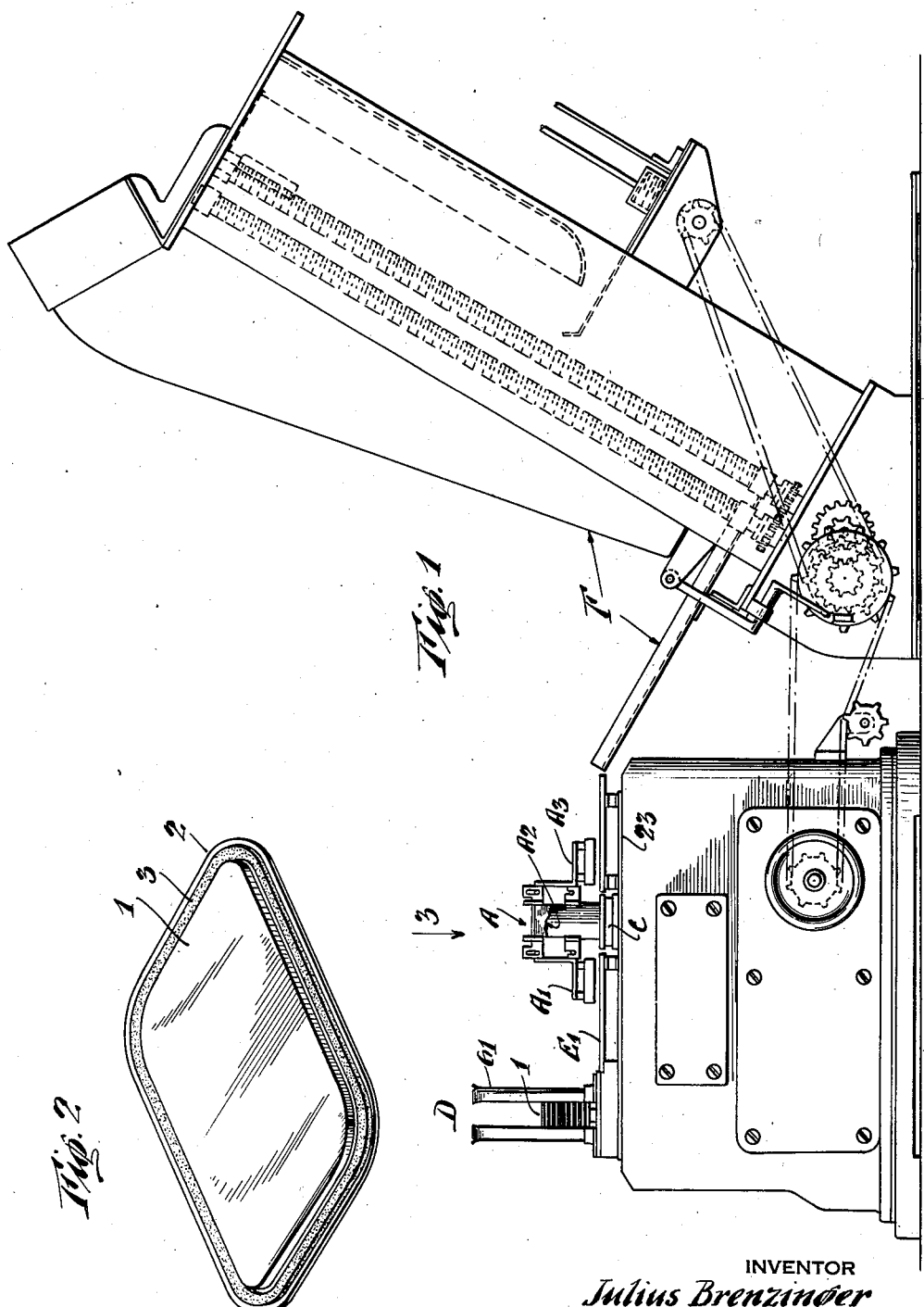
INVENTOR
Julius Brenzinger
BY
ATTORNEY

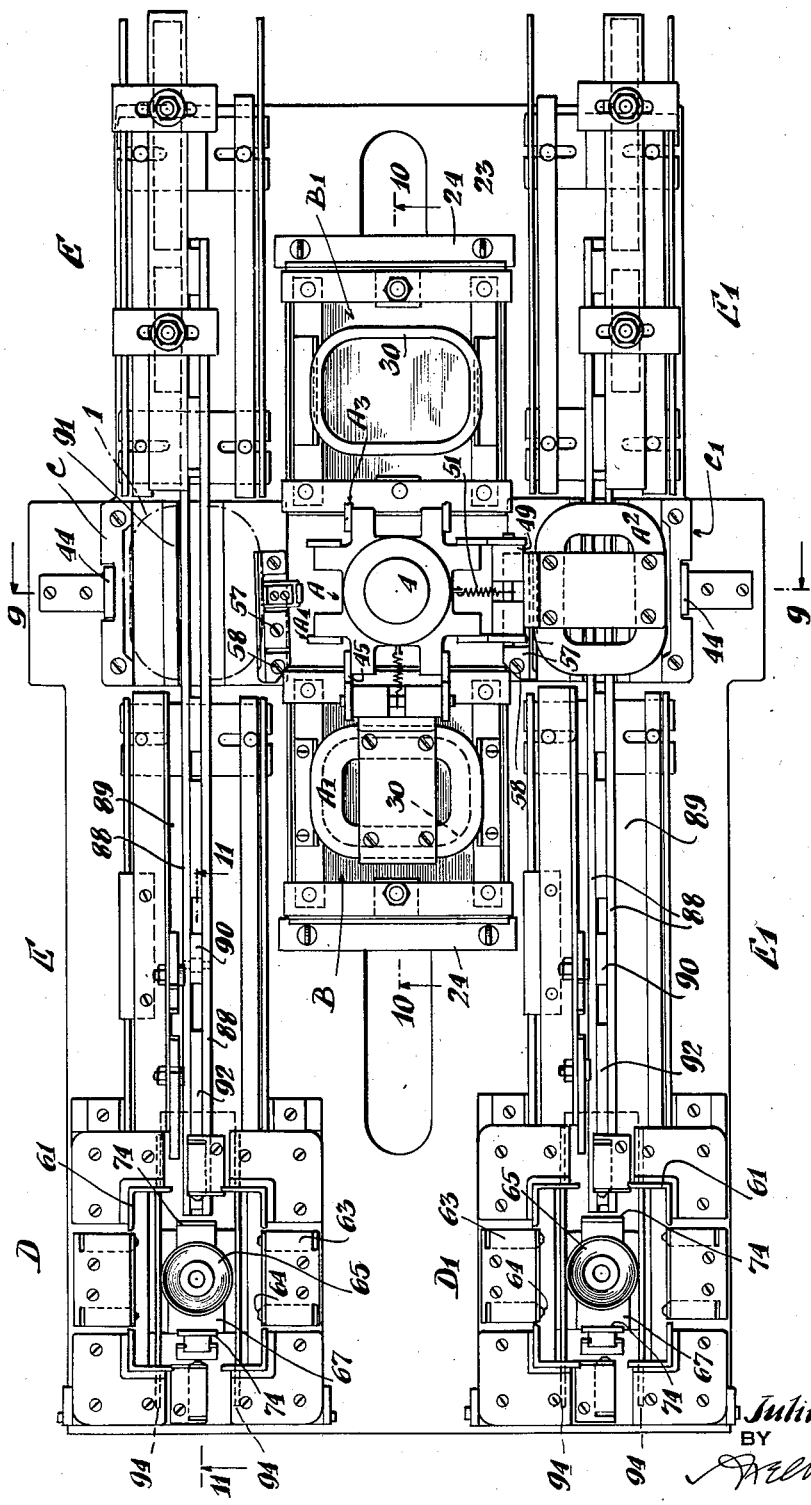

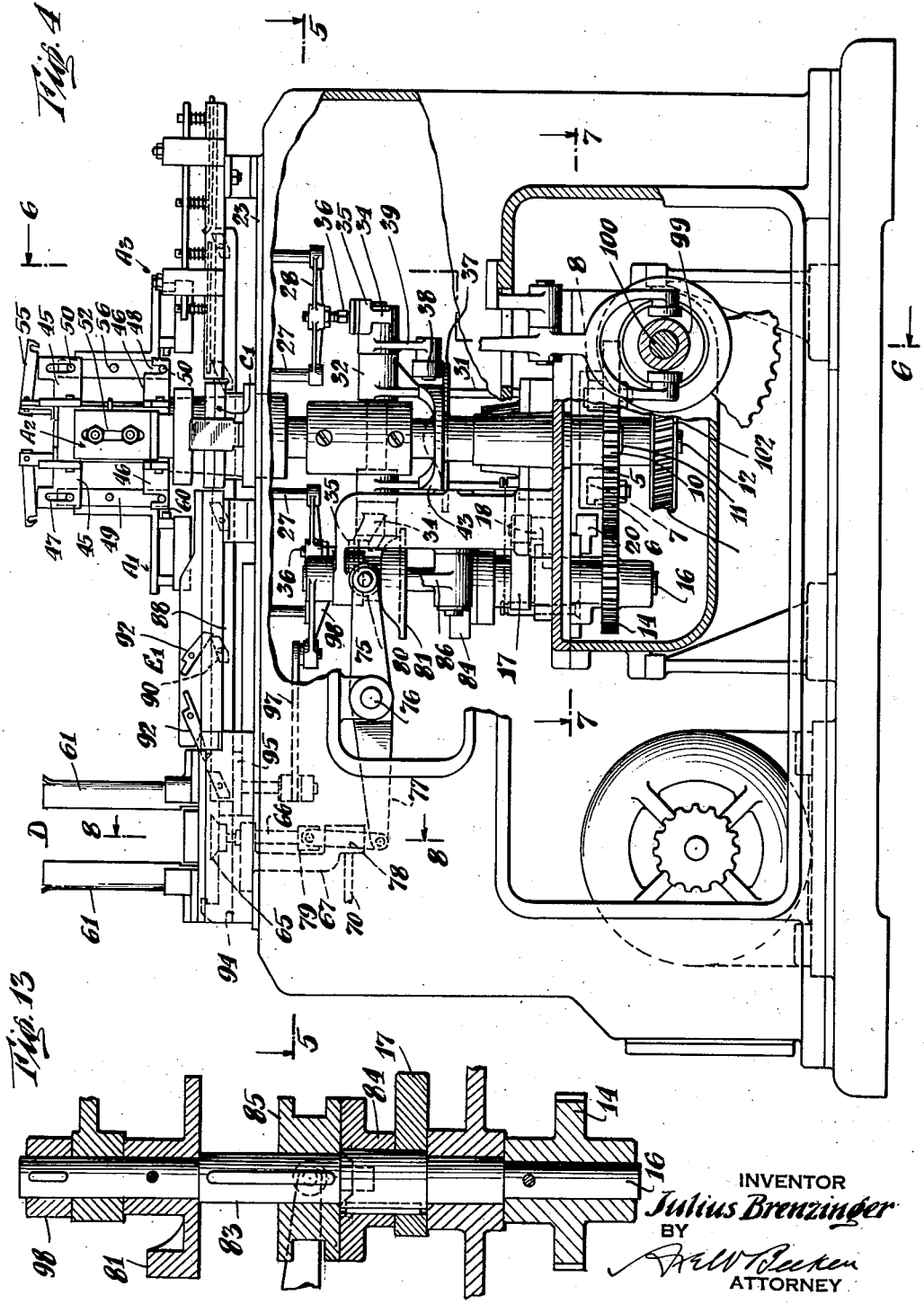

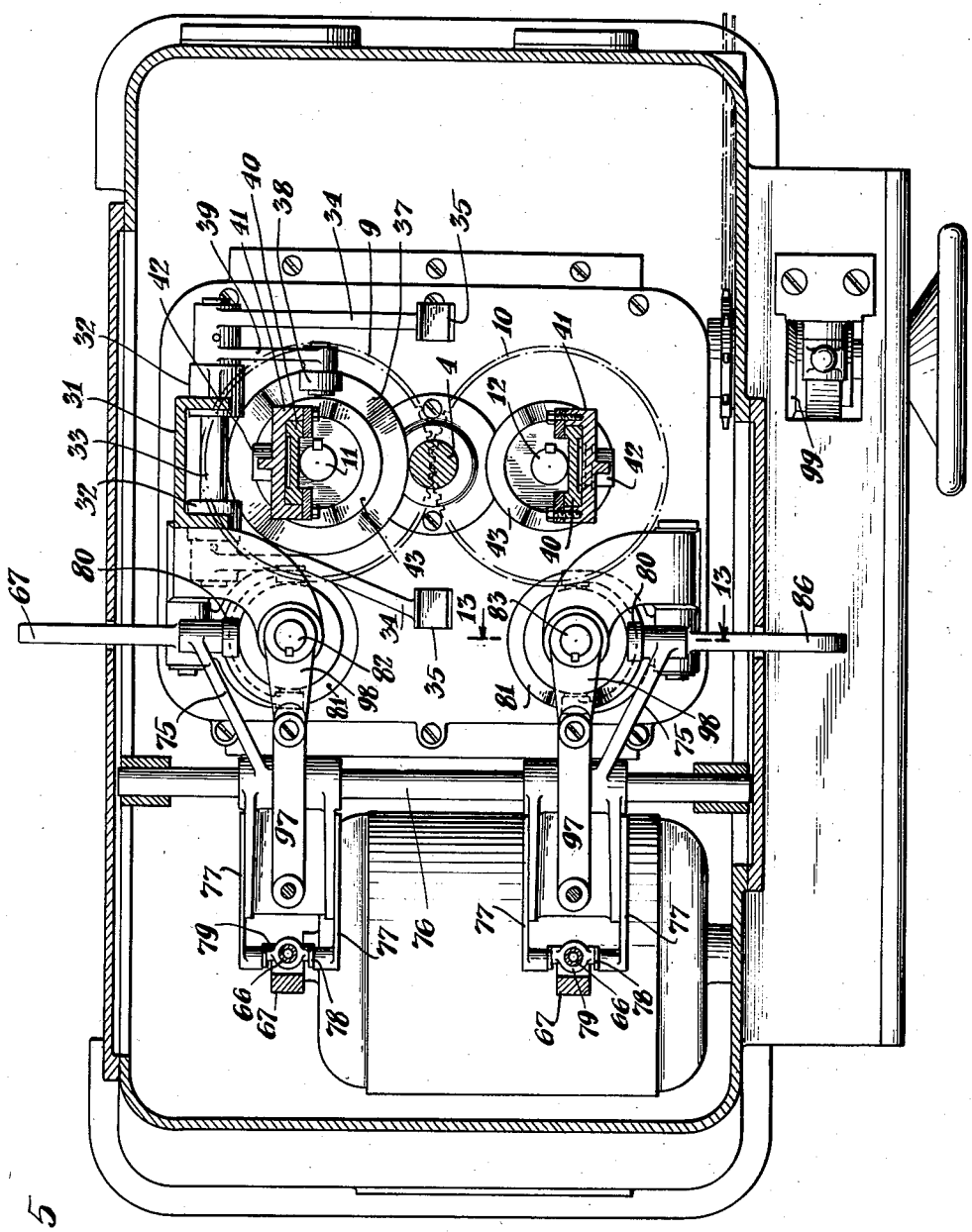

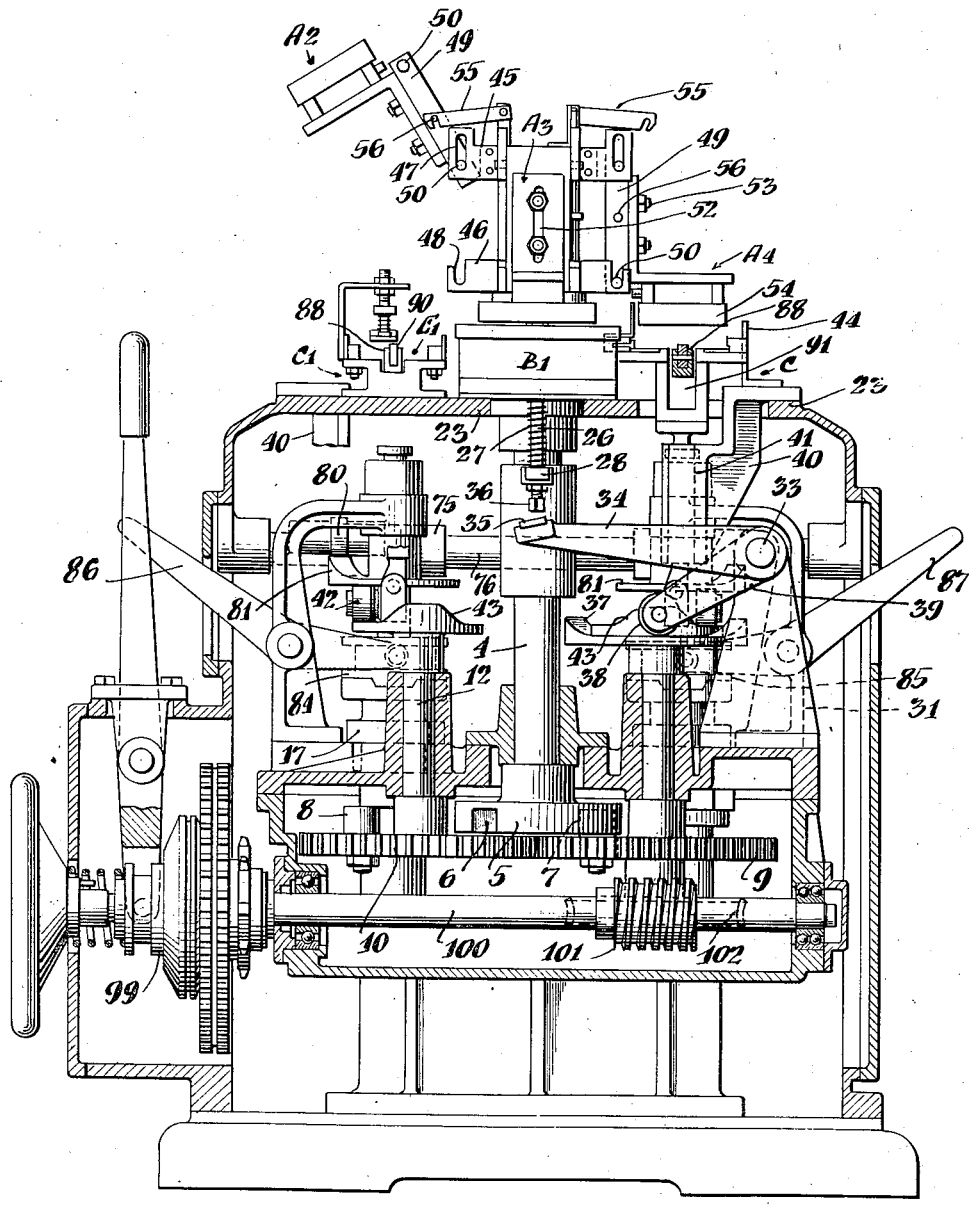

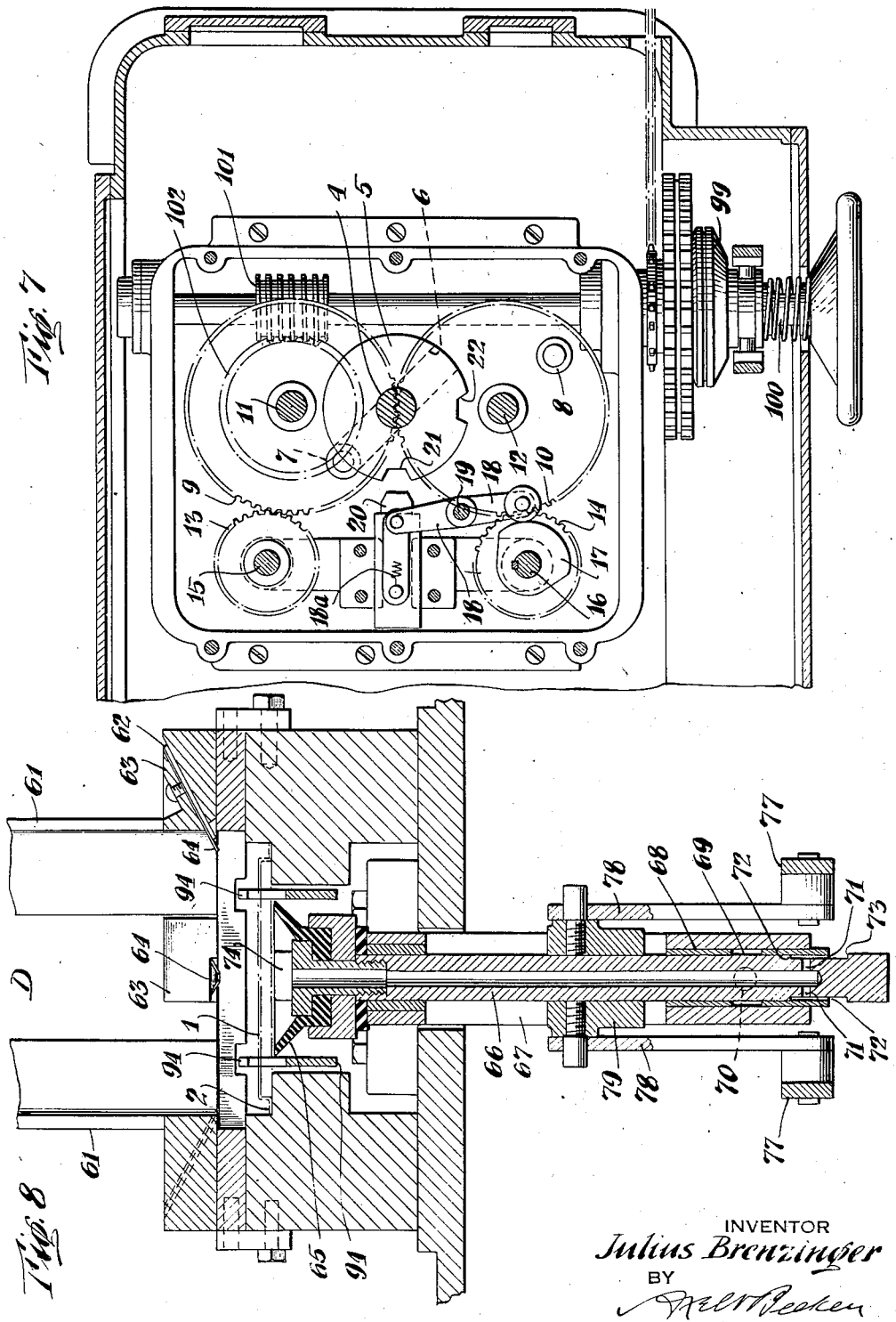

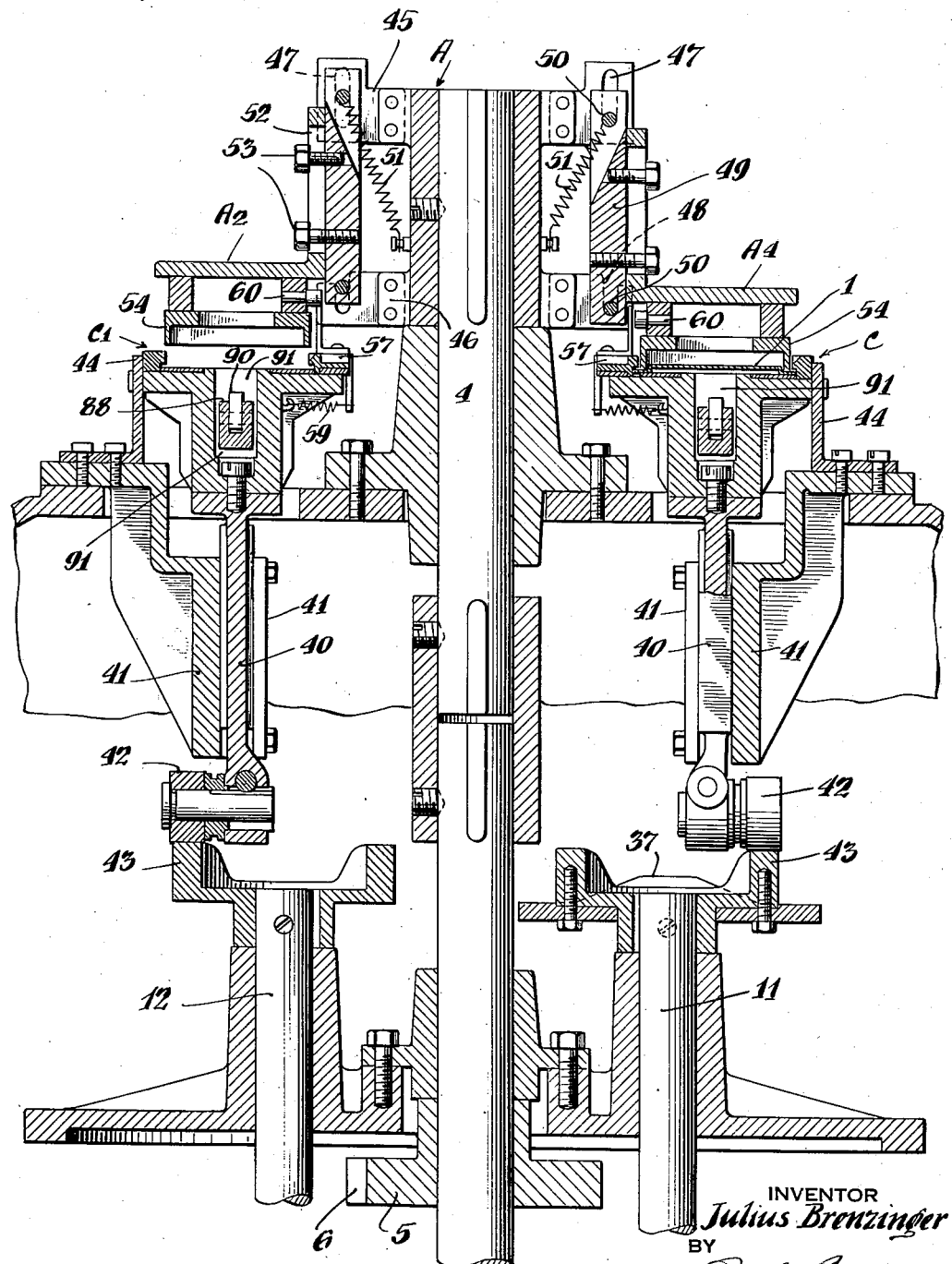

June 30, 1942.    J. BRENZINGER    2,288,224
LINING MACHINE
Filed Nov. 14, 1940    10 Sheets-Sheet 8

INVENTOR
Julius Brenzinger
BY
ATTORNEY

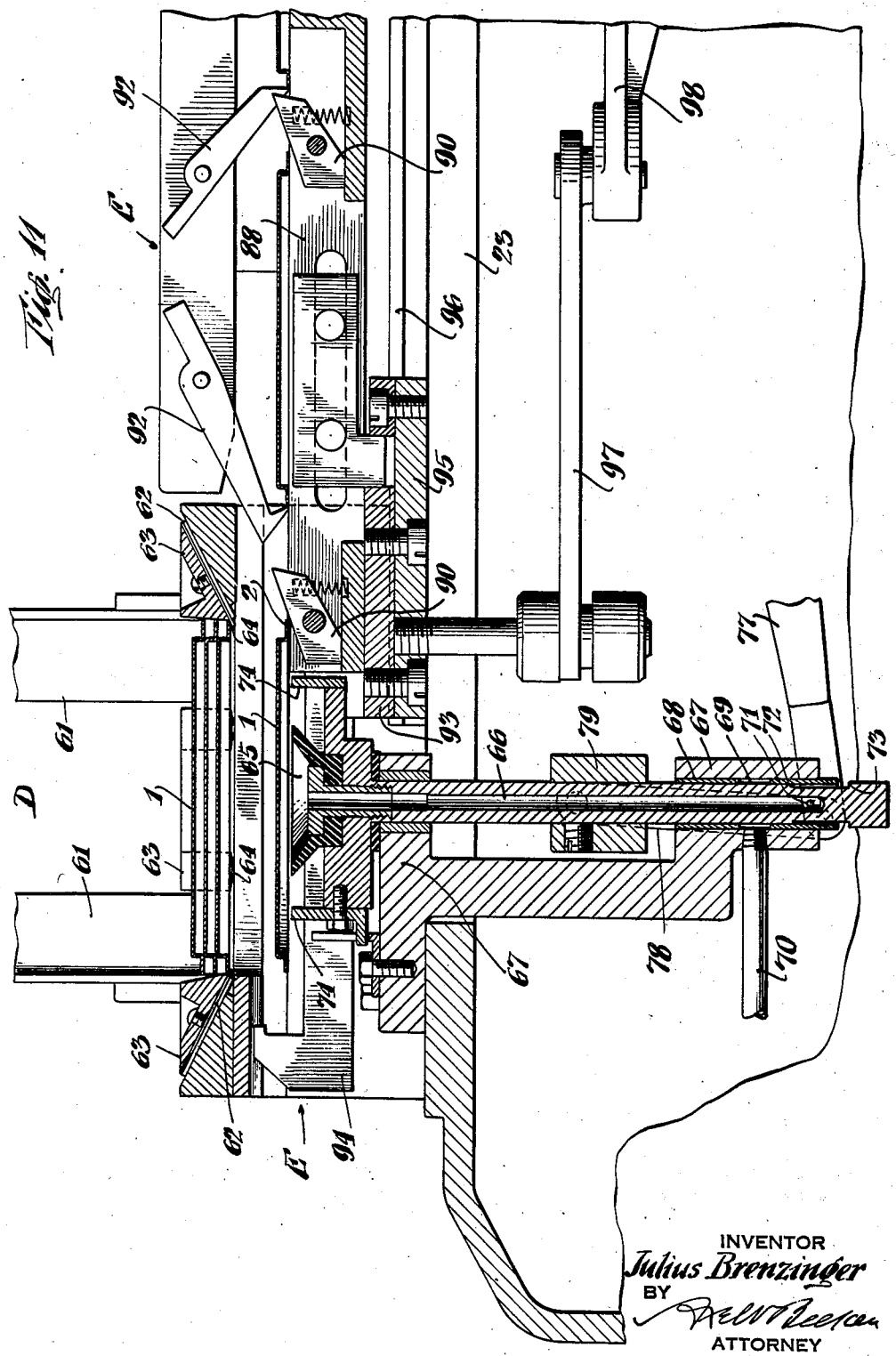

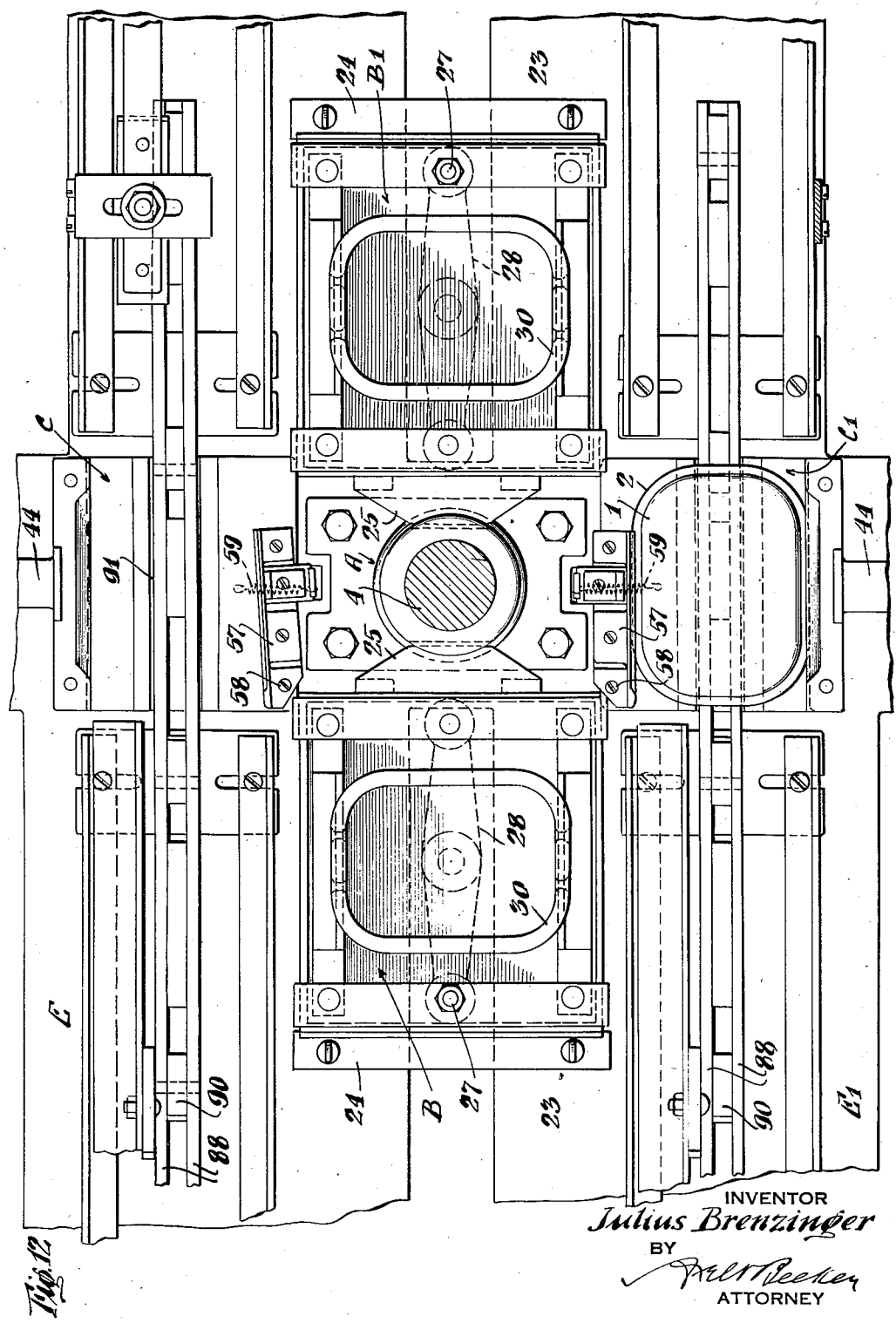

Patented June 30, 1942

2,288,224

UNITED STATES PATENT OFFICE 2,288,224

LINING MACHINE

Julius Brenzinger, Fairfield, Conn., assignor to The Max Ams Machine Company, Bridgeport, Conn., a corporation of New York Application November 14, 1940, Serial No. 365,622

3 Claims. (Cl. 113—80)

This invention relates to a machine that applies lining material to an object such as a canend, said lining material thereafter solidifying to form a gasket or the like.

The main object and feature of the invention is the production of a compact machine that will quickly and effectively perform the function of applying lining material to an object such as a can-end.

In the accompanying drawings, the invention is disclosed in a concrete and preferred form in which Fig. 1 is a general view in side elevation, with parts omitted, of a lining machine, embodying the invention, and the delivery mechanism thereof;

Fig. 2 is a perspective view of a can-end having a gasket of lining material;

Fig. 3 is a top plan view of the lining machine shown in Fig. 1, looking in the direction of arrow 3 of Fig. 1, with parts omitted;

Fig. 4 is an enlarged view of the lining machine shown in Fig. 1 with parts broken away and in section;

Fig. 5 is a horizontal sectional view substantially on the plane of line 5—5 of Fig. 4;

Fig. 6 is a vertical sectional view substantially on the plane of irregular line 6—6 of Fig. 4;

Fig. 7 is a horizontal sectional view substantially on the plane of line 7—7 of Fig. 4;

Fig. 8 is a vertical sectional view substantially on the plane of line 8—8 of Fig. 4;

Fig. 9 is a vertical sectional view substantially on the plane of line 9—9 of Fig. 3;

Fig. 11 is a vertical sectional view substantially on the plane of line 11—11 of Fig. 3;

Fig. 12 is a horizontal sectional view substantially on the plane of line 12—12 of Fig. 10; and Fig. 13 is a sectional view substantially on the plane of line 13—13 of Fig. 5.

Figure 10:
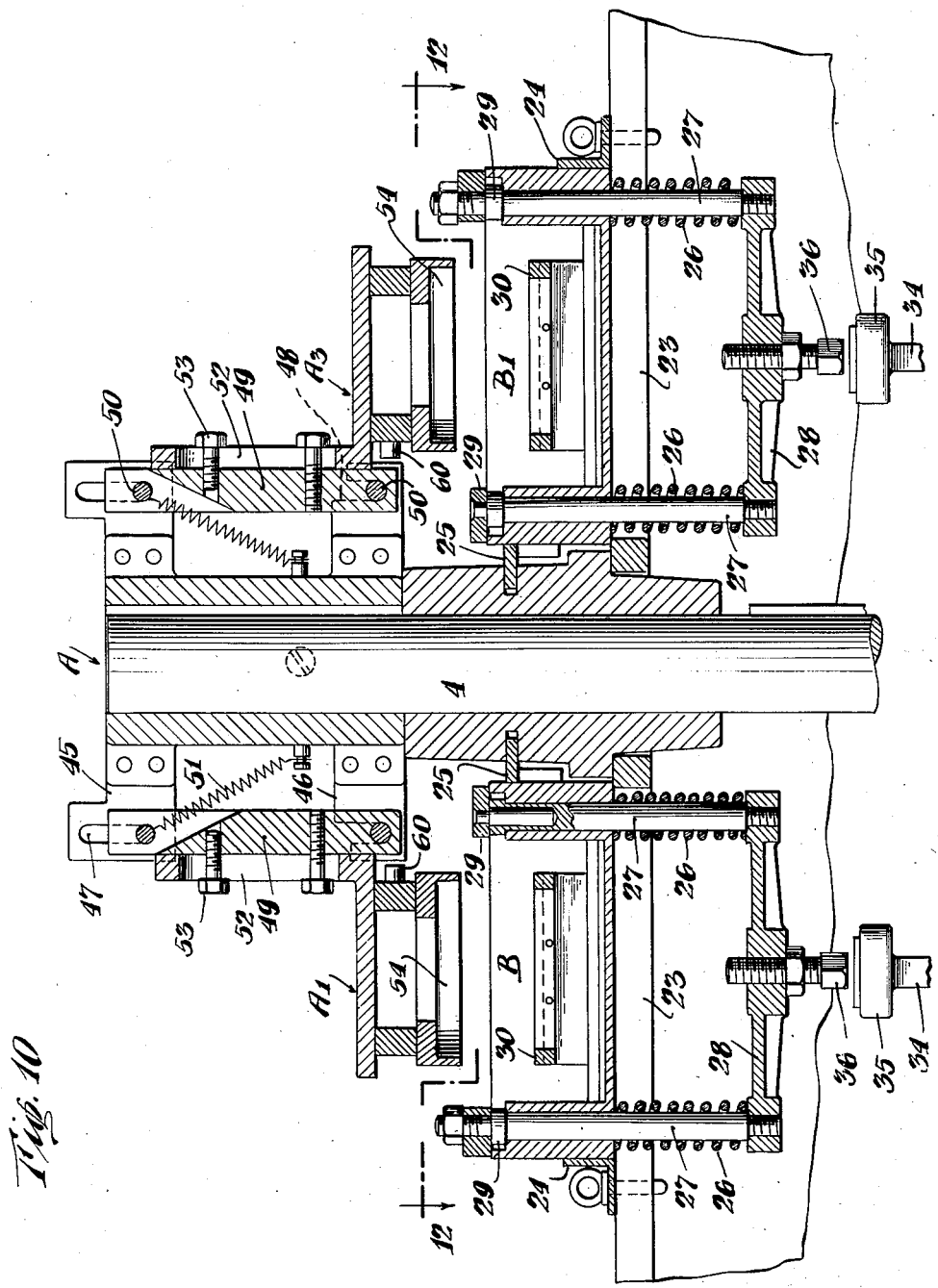
Fig. 10 is a vertical sectional view substantially on the plane of line 10—10 of Fig. 3.

Referring to Fig. 2, 1 indicates a can-end having a flat flange or rim 2 carrying a gasket 3 of lining material. The particular machine herein disclosed is designed to supply the lining material, in a viscous state, to the rim of the canend. Referring particularly to Fig. 3, A indicates a turret member that here oscillates through an orbit of ninety degrees and carries four mold members A1, A2, A3 and A4. B and B1 indicate two supply tanks, containing lining material, located opposite to each other, one on each side of the turret member. C and C1 denote two can-ends supporting platforms located opposite to each other, one on each side of the turret member and with their common axis at right angles to that of the tanks. Suitable means are provided to feed the can-ends or blanks to and from the platform. The function of the oscillating turret A is to carry mold or transfer members A1, etc., back and forth between the tanks and the platforms, and suitable means are provided for raising and lowering said tanks and platforms so as to supply the molding members with lining material and to transfer it from the molding members to the can-ends on the platforms. The arrangement is in duplicate in that there are two spaced-apart and parallel can-end raceways 89 or two sets of can-advancing paths E, E and E1, E1 in which platforms C and C1 are located opposite to each other, with turret member A located between the platforms, and with tanks B and B1 located opposite to each other, one on each side of the turret and intermediate the raceways. Mold members A1, A2, A3 and A4 are in spaced relation corresponding to the spaced relation of the tanks and platforms. Two of said mold members, as A2 and A4 are therefore caused to simultaneously apply lining material from said tanks to two can-ends, one on each platform, in alternation with the same action of the other two mold members as A1 and A3.

The driving means (see particularly Figs. 4, 6 and 7) to oscillate the turret are, in the present instance, as follows: carried by shaft 4 of turret A is a disc 5 having a transverse slot or guideway 6 with which engage rollers 7 and 8 on two intermeshing gears 9 and 10 on shafts 11 and 12. Rotation of gears 9 and 10 will bring first one of rollers 7 or 8 into engagement with slot 6 and turn disc 5 and shaft 4 a quarter of a revolution in one direction, after which the roller leaves the slot and rotation of disc 5 and shaft 4 ceases. Continued rotation of gears 9 and 10 will eventually bring the other roller 7 or 8 into engagement with said slot thereby turning disc 5 and shaft 4 in the opposite direction a quarter of a revolution after which the roller leaves the slot and rotation of disc 5 and shaft 4 ceases. Gears 9 and 10 mesh respectively with pinions 13 and 14 on shafts 15 and 16, and the latter carries a cam 17 that actuates a lever 18, pivoted at 19, and connected to indexing finger 20 adapted to engage and disengage in notches 21 and 22 of disc 5. A spring 18a keeps the roll of lever 18 against cam 17. The function of this indexing finger is to prevent overrunning of disc 5 as the rolls 7 or 8 leave the slot. The foregoing means thus produce an intermittent oscillating motion of the turret and causes it, at the end of each stroke, to register the mold members accurately with respect to the tanks or supporting platforms as the case may be.

Each of the tanks B and B1 is constructed alike, and a description of one will therefore suffice for both. Referring particularly to Figs. 4, 5, 6 and 10, each tank rests on the framework as at 23 and is slidable as in guides 24 and 25. It is urged into its lowermost position by springs 26 surrounding pins 27 of a yoke 28. Pins 27 extend vertically through the walls of the tank and have, at their upper ends, heads 29. It will be seen that, when yoke 28 is elevated, the tank is carried upward under yielding pressure, and that said springs also serve to lower the tank when lifting movement ceases to be applied to the yoke. Each tank is provided with a contact member 30 of a shape corresponding to that of the rim of the can-end (Figs. 2 and 12). In the present instance, the actuating means (Figs. 4, 5 and 6) to raise the tanks take the following form: 31 indicates a bracket, mounted on the framework, having bearings 32 that carry a rockshaft 33. On this rockshaft are mounted two lifter-arms 34, the outer ends 35 of which are designed to engage members 36 of yokes 28. Movement is imparted to rockshaft 33 by means of cam 37, on shaft 11, through the instrumentality of cam roll 38 and arm 39 which latter is fastened to rockshaft 33.

Can-end platforms C and C1 and the means to raise and lower them (Figs. 5, 6 and 9) are alike, and a description of one will therefore suffice for both. Each platform is provided with a tailstock constituting a slide 40 that operates in guides 41 and carries at its lower end a cam roll 42 actuated by a cam 43. Cams 43 are mounted on shafts 11 and 12. Also assisting in guiding the platforms, are vertical guide members 44 carried by the framework.

The four mold members A1, A2, A3 and A4, carried by turret member A, are of identical construction, and a description of one will suffice for all. Referring more particularly to Figs. 3, 6, 9 and 10, turret member A carries upper and lower pairs of brackets 45 and 46 having upper slots 47 and lower open slots 48. 49 indicates a slide mounted by means of pins 50 in said slots, and said slide is urged into its lower position by spring 51. The mold member carries an upstanding slotted wall 52 secured by bolts 53 to the slide, and is provided with a contact member 54 that corresponds in shape to contact member 30 of the tanks and to the shape of the rim of the can-end. From the foregoing it will be understood that, when either contact member 30 of a rising tank B or the can-end of a rising platform C engages the mold member, the mold member will yield upwardly to a slight extent against the tension of spring 51 so that the transfer of lining material takes place without undue shock. If it be desired to clean the mold member, slide 49 is elevated until pin 50 comes out of slot 48, after which the assemblage can be swung outwardly and upwardly with pin 50 as a pivot (Fig. 6) and the parts can be held in elevated position by means of a pivoted latch 55 engaging with pin 56.

Provision is made whereby, when a can-end is absent from platform C or C1, the mold member will not descend far enough to deposit lining material on said platform. In the present instance, the means for accomplishing this takes the following form: carried by each platform is a detector finger 57 (Figs. 3, 9 and 12) supported on a vertical pivot 58 and urged into the path of the can-end by spring 59. When a can-end arrives on the platform, it moves the detector finger against the tension of spring 59, but if no can-end arrives on the platform, then said detector finger remains in the position into which it is urged by spring 59. Carried by the mold member is a pin 60 (Fig. 9) so located that, in the absence of a can-end, the detector finger will engage said pin and, as shown at the left-hand side of Fig. 9, will raise slide 48 against tension of spring 51 as the mold member descends. If, on the other hand, a can-end is present as shown at the right-hand side of Fig. 9, said detector finger will clear pin 60 and the mold member will deposit lining material on the can-end.

Any suitable means can be used to separate the can-ends from a stack and for feeding them to and from a platform as C or C1. It is preferred, however, to use the construction shown in the drawings, principally in Figs. 3, 4, 5, 8 and 11, as the construction therein disclosed embodies novel and valuable features.

In the present instance, as there are two platforms C and C1, there are two can-end stacks D and D1 and two sets of can-end advancing paths E and E1. Description of one of each of these will suffice for both. Each stack is provided with upright walls 61 and, at its lower end, has a plurality of flat, stiff spring members 62. These spring members are inclined in a downward and inward direction as shown and are held by clamps 63 throughout the greater part of their length so that only their lower ends 64 project from the clamps. Can-ends 1 are supported on these lower ends or lips. In the present instance, a suction cup 65 is used to separate the can-ends from the stack and to pull them, one by one, past spring lips 64. Suction cup 65 is carried by a hollow stem 66 slidably mounted in bracket 67 of the framework. 68 indicates a stationary sleeve provided with an annular port 69 that is in communication with suction pipe 70, and which sleeve constitutes part of a suitable valve mechanism to make and break the vacuum. Hollow stem 66 has transverse ports 71 near its lower end that connect the interior of said stem with circumferential port 72. It will be understood that, when hollow stem 66 rises, circumferential port 72 comes opposite annular port 69 thereby establishing communication between suction pipe 70 and the interior of stem 66 by way of transverse ports 71, and at the same time closes the lower end of port 72, by means of surface 73, to the atmosphere. At the time this occurs, the suction cup will be in engagement with the under surface of the lowermost can-end of the stack. When the suction cup descends, it will pull said can-end down, hollow stem 66 will bring transverse port 71 out of line with circumferential port 69 and circumferential port 72 will open to the atmosphere thus breaking the vacuum. Thus the up-and-down movement of stem 66 not only causes travel of the suction cup but also actuates the valve mechanism to make and break the vacuum. Associated with the suction cup, and moving up and down with it are can-end supporting members 74 which aid in sustaining the can-end as it is lowered. Suitable means are provided for raising and lowering hollow stem 66, which means, in the present instance, take the following form. 75 indicates a lever pivoted on shaft 76 (Figs. 4, 5, 8 and 11), and one end of this lever is connected by means of arms 77 to links 78 that are pivoted to sleeve 79 on stem 66. Lever 75 carries at its other end a cam roll 80 that engages cam 81 on shaft 82 or 83, which shafts are in line respectively with shafts 15 and 16 and are respectively connected to the latter by means of stationary and movable clutch members 84 and 85 (Fig. 13), the latter being movable by means of levers 86 and 87 so as to render shafts 82 or 83 active or inactive as may be desired.

Suitable means are provided for advancing the can-end or blank after it has been moved down by suction cup 65. In general, such means consist of a reciprocatory member 88 (Figs. 3, 8 and 11) that extends centrally of the conventional raceway 89 and which is provided with the conventional spring-pressed feeding dogs 90. This reciprocatory member 88 also extends through a slot or opening 91 (Fig. 9) in the can-end supporting platform and beyond to delivery mechanism F (Fig. 1) so that the can-end is advanced step by step through the machine from one end to the other. Associated with the feeding mechanism are stop dogs 92 (Fig. 11) to prevent retrograde movement of the can-ends or blanks while the feed dogs move back. At the end adjacent stack D, reciprocatory member 88 is provided with a transverse bridge piece 93 carrying two feed members 94, one on each side of suction cup 65 so as to move the can-end or blank from a position directly beneath stack D to a position where the first feed dog 90 can engage it. It will, of course, be understood that there is a can-end feeding mechanism associated with each stack at each side of the machine. Suitable means are employed to effect reciprocation of reciprocatory member 88, which means in the present instance take the following form: secured to member 88 is a slide 95 that travels in guides 96, and connected to slide 95 are two links 97 and 98, the latter of which is connected to shaft 82 or 83 as the case may be. It will be observed that rotation of these shafts causes reciprocation of slide 95. It will further be noted that, if it be desired to silence one feed line of the machine, clutch 85 can be disengaged thereby stopping rotation of shaft 82 or 83 as the case may be, and by these means the reciprocation of member 88 and the up-and-down movement of hollow stem 66 are silenced.

Power can be applied to the machine in any suitable way. Preferably (Figs. 4, 5, 6 and 7), power is applied by means of a clutch 99 to shaft 100, carrying a worm 101 that engages a worm wheel 102 on shaft 11, and from this shaft the rest of the machine is driven in the manner previously indicated.

Delivery mechanism F need not be described in detail as it forms no part of the present invention.

The general operation of the machine is as follows: can-ends 1 are removed one by one from each of stacks D and D1 by suction cups 65 and are then advanced step by step by members 88 until they reach supporting platforms C and C1. Turret A oscillates and at the time a can-end is supported on platforms C and C1, mold members such as A2 and A4 will be above the platforms and mold members such as A1 and A3 will be above tanks B and B1. The tanks and platforms now rise and lining material is transferred from the tanks to mold members A1 and A3, and at the same time lining material is transferred from mold members A2 and A4 to the can-ends on the platforms. When lowering of the platforms occurs, the can-ends are removed from the platforms by member 88 and eventually reach the delivery mechanism. When the platforms are lowered, the tanks are likewise lowered, and turret member A moves ninety degrees, so that during the next elevation of the tanks and platforms a different mold member will be above said tanks and platforms from that previously occupying such position.

The mechanism for separating and feeding the blanks or can-ends from the stacks containing them is not claimed herein but forms the subject matter of a separate application filed March 28, 1941, Ser. No. 385,644.

I claim:

1. In a lining machine, a turret member; two supply tanks, containing lining material, located opposite to each other, one on each side of said turret; two can-end supporting platforms, located opposite to each other, one on each side of said turret and with their common axis at right angles to that of the tanks; four mold members carried by the turret above and in spaced relation corresponding to the spaced relation of the tanks and platforms; means to oscillate said turret through an orbit of ninety degrees; and means to raise and lower the tanks and the platforms with respect to the mold members.

2. In a lining machine, two spaced-apart and parallel can-end raceways; two can-end supporting platforms, one interposed in each raceway opposite to the other; a turret member intermediate the platforms; two supply tanks, containing lining material, located opposite to each other, one on each side of said turret and intermediate the raceways; four mold members carried by the turret above and in spaced relation corresponding to the spaced relation of the tanks and platforms to transfer lining material from the tanks to the can-ends on the platforms; means to oscillate said turret to cause each mold member to alternately be brought in line with a tank and a platform; and means to raise and lower the tanks and platforms with respect to the mold members.

3. In a lining machine, two spaced-apart and parallel can-end raceways; two can-end supporting platforms, one interposed in each raceway opposite to the other; two supply tanks, containing lining material, located intermediate the raceways; four mold members; and driving means to cause two of said mold members to simultaneously apply lining material from said tanks to two can-ends, one on each platform, in alternation with the same action of the other two mold members.

JULIUS BRENZINGER.